United States Patent Office 3,479,408
Patented Nov. 18, 1969

3,479,408
β,β'-THIODIETHYL SULFONES
Albert C. Perrino, Cranston, and Michael G. Israel, East Providence, R.I., assignors to I.C.I./Organics/Inc., Providence, R.I., a corporation of Rhode Island
No Drawing. Filed Oct. 26, 1966, Ser. No. 589,529
Int. Cl. C07c 147/02, 149/06
U.S. Cl. 260—607         5 Claims

ABSTRACT OF THE DISCLOSURE

β-thioethyl sulfones, especially β,β'-dithioethyl sulfones, produced by the reaction of vinyl sulfones with mercaptans, and stabilized polyolefin compositions containing β-thioethyl sulfones.

Background of the invention

Polyolefin polymers, such as polyethylene, polypropylene, polybutene-1, poly-3-methyl-butene-1, poly-4-methyl pentene-1, ethylene/propylene copolymers and the like are commonly subjected to elevated temperature in the course of processing or fabrication into useful articles. Certain processing methods, such as rolling, injection molding, extrusion and the like are generally at elevated temperatures and usually result in oxidative degradation of such polyolefins. In addition, many uses of polyolefins, such as in electrical insulation and the like, often expose the polyolefin polymers to elevated service temperatures. To minimize oxidative deterioration in polyolefins, antioxidants or stabilizers are generally incorporated therein. Thioethers have been frequently used as polyolefin stabilizers, generally in combination with phenolic antioxidants.

The thioethers used by the prior art, such as thiodialkanoic acid esters, tend to cause molecular weight reduction of polyolefins such as polypropylene at high temperatures encountered during fabrication. The degradation is evidenced by a substantial increase in melt flow rate of the polymer and becomes a limiting factor with regard to the amount of thioether which can be used. As a result, the most effective combination of oxidative stabilizers cannot generally be used.

When the term "polyolefin" is used in this specification it refers to solid poly-α-olefins, preferably containing from 2 to 10 carbon atoms, and of both the so-called "low density" and "high density," or high crystallinity, types. Additional examples of polyolefins are poly (pentene-1), poly (3,3-dimethyl butene-1), poly (4,4-dimethyl butene-1), poly (octene-1), poly (decene-1), and the like, although this listing is not to be construed to limit the scope of the present invention. Generally, the solid polyolefins will have an average molecular weight of 15,000 and more usually at least 20,000 although the present invention may also be used to stabilize the so-called poly-α-olefin waxes having lower average molecular weight, generally of the order of 3,000 to 12,000.

Objects of the invention

It is an object of the present invention to provide, as a novel class of thioethers, β-thioethyl sulfones. It is an additional object of this invention to provide a process for the production of β-thioethyl sulfones. It is a further object of this invention to provide stabilized polyolefin compositions containing β-thioethyl sulfones. It is yet another object of this invention to provide, as preferred compounds, β,β'-dithioethyl sulfones and the process for making the same. It is yet a further object of this invention to provide stabilized polyolefin compositions containing β,β'-dithioethyl sulfones.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes or modifications within the scope of the invention will become apparent to those skilled in the art from this detailed description.

Summary of the invention

It has been found that the β-thioethyl sulfones and especially the β,β'-dithioethyl sulfones, of this invention, exhibit superior heat and antioxidant effects when incorporated in polyolefin compositions, either alone or in combination with conventional hindered phenolic antioxidants. The superior heat and oxidative stabilizing efficiencies of β-thioethyl sulfones and especially the β,β'-dithioethyl sulfones is manifested by (a) increased life of the polyolefin at elevated temperatures and (b) less degradation of the polyolefin during processing at elevated temperatures. This is a very important property as this allows the thio antioxidant to be incorporated at higher concentrations, thereby affording the most effective stabilization.

The β-thioethyl sulfones and β,β'-dithioethyl sulfones of this invention are prepared by reacting allyl sulfones, vinyl sulfones, or precursers to vinyl sulfones, e.g. β,β'-dihydroxyethyl sulfone, with mercaptans under alkaline conditions.

Description of the invention

The preferred sulfones of this invention will have either Formula I, Formula II or Formula III.

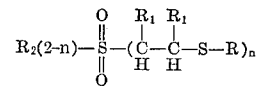

(Formula I)

wherein R and $R_2$ are independently selected from the group consisting of alkyl radicals of from 6 to 22 carbon atoms in length, alkaryl radicals or aralkyl radicals or aryl radicals and each $R_1$ is independently selected from the group consisting of hydrogen atoms, alkyl radicals of from 1 to 4 carbon atoms in length, and aryl radicals, and $n$ is 1 or 2. When $n$ is 2, each R may be the same or different.

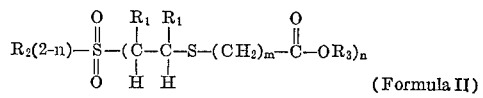

(Formula II)

wherein $R_3$ is independently selected from the group consisting of hydrogen atoms, alkaline earth metals, alkali metals, alkyl radicals of from 6 to 22 carbon atoms in length, alkaryl radicals, and aryl radicals, and $R_2$ is an alkyl radical of from 6 to 22 carbon atoms in length, an alkaryl radical, an aralkyl radical or an aryl radical and each $R_1$ is independently selected from the group consisting of hydrogen atoms, alkyl radicals of from 1 to 4 carbon atoms in length and aryl radicals, $n$ is 1 or 2 and $m$ is 1 to 4. When $n$ is 2, each R and each $m$ may be the same or different.

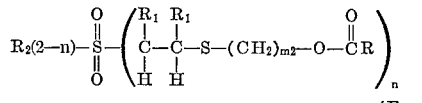

(Formula III)

wherein $R_2$ and R are independently selected from the group consisting of alkyl radicals of from 6 to 22 carbon atoms in length, alkaryl radicals, aralkyl radicals, and aryl radicals and each $R_1$ is an alkyl radical of from 1 to 4 carbon atoms in length, or an aryl radical, $n$ is 1 to 2, and $m_2$ is 2 to 6. When $n$ is 2, each R and each $m$ may be the same or different. When the term "β-thioethyl sulfone" is used in this specification, it is to be construed to generically mean both β-thioethyl sulfone and β,β'-dithioethyl sulfone.

Examples of alkyl radicals of 6 to 22 carbon atoms represented by R in the above formulas are dodecyl, tetradecyl, hexadecyl, octadecyl, hexyl, octyl, nonyl, decyl, etc. Examples of alkaryl radicals represented by R are 4-t-butyl phenyl, m- and p-tolyl, xylyl, etc. Examples of aryl radicals represented by R are phenyl, naphthyl, etc. Examples of aralkyl radicals represented by R are benzyl, phenylethyl, etc. Suitable examples of radicals represented by $R_2$ include those listed above as represented by R.

Examples of alkyl radicals represented by $R_1$ are methyl, ethyl, n-propyl, i-propyl, n-butyl, s-butyl, and t-butyl. Examples of aryl radicals as represented by $R_1$ are phenyl, naphthyl, etc.

The preferred thio ethers of this invention are β,β'-dithioethyl sulfones.

The β-thioethyl sulfones of Formula I may be prepared by reacting substituted or unsubstituted allyl sulfones, vinyl sulfones, or precursors to vinyl sulfones with mercaptans under alkaline conditions. The preferred β,β'-dithioethyl sulfones of this invention are prepared by reacting substituted or unsubstituted divinyl sulfones with mercaptans. The reaction of the vinyl or divinyl sulfones with mercaptans is generally at a reaction temperature of 10 to 150° C. and a pressure of 760 mm. Hg although pressures above and below atmospheric can be used if desired, and preferably the reaction is at a reaction temperature of 65 to 110° C.

The β-(carboxyalkylthio)ethyl sulfones of Formula II may be prepared by reacting the vinyl sulfone with a mercapto-alkyl acid of 1 to 5 carbon atoms in length. The β-carboxyalkyl thioethyl sulfone or β,β'-bis(carboxyalkylthio)diethyl sulfone may be subsequently esterified with an alcohol of the formula ROH wherein R is an alkyl radical of from 6 to 22 carbon atoms in length, and alkaryl radical, or an aryl radical.

The β-(hydroxyalkylthio) ethyl sulfones of Formula III may be prepared by reacting the vinyl sulfone with a mercapto-alkyl alcohol of 2–6 carbon atoms in length. The β-(hydroxyalkylthio) ethyl sulfone or β,β'-bis(hydroxyalkylthio) diethyl sulfone may subsequently be used to esterify carboxylic acids of the formula RCOOH wherein R is an alkyl radical of from 1 to 21 carbon atoms in length, an alkaryl radical or an aryl radical.

Conventional catalysts, such as sodium metal or sodium salts, may be used in the reaction of the vinyl sulfone with the mercaptan, as is known to those of ordinary skill in the art. Alternatively, if no catalyst is present, a higher reaction temperature may be used.

While the mole ratio of the vinyl sulfone to the mercaptan is preferably 1:1 to produce β-thioethyl sulfones, and preferably 1:2 to produce β,β'-dithioethyl sulfones, the mole ratios of vinyl sulfone:mercaptan may vary between 1 and 2 to produce a mixture of β-thioethyl and β,β'-dithioethyl sulfones.

The polyolefin compositions containing one or more of the polyolefins described in the section entitled "Background of the invention" are stabilized in accordance with the present invention by the incorporation of 0.001 to 5% by weight of the polyolefin of the β-thioethyl sulfone of the present invention. More preferably, the polyolefin composition contains 0.05 to 1.0% by weight of the polyolefin of the β-thioethyl sulfones. The β-thioethyl sulfones may be used as the sole polyolefin composition stabilizer, or they may be used in conjunction with conventional, known phenolic antioxidants.

The stabilized polyolefin compositions of this invention may conveniently be made by any of the conventional mastication processes, or other known ways of incorporating stabilizers, in polyolefins may be utilized. For example, a satisfactory method of producing stabilized polyolefin compositions is to tumble blend the ingredients with the polyolefin and then to extrude the mixture so obtained. This method is most advantageously employed where all of the polyolefin compositions are powders. Another satisfactory method for mixing the stabilizing ingredients and the polyolefin is to add a solution of the stabilizing components to the polyolefin powder and then to remove the solvent for the stabilizing components by evaporation.

The preferred stabilized polyolefin compositions of this invention contain conventional phenolic antioxidants as well as the β-thioethyl sulfones. The sulfones and the phenolic antioxidant appear to exert a synergistic stabilizing effect, as has been noted to occur with phenolic antioxidants and the known, thio enters which have been previously used in polyolefin compositions.

Any one of the large number of hindered phenols known to function as stabilizers in polyethylene and other polymers may be used. Such hindered phenols are the 2,4,6-trialkyl phenols, the alkylated bisphenols, and the alkylated trisphenols.

Suitable 2,4,6-trialkyl phenols include those described for use in rubbery polymers in United States Patent No. 2,581,907, issued Jan. 8, 1952 to Smith, Jr. et al. Good results may be obtained with any of the materials described in the patent, when used in conjunction with other components according to this invention, although the preferred 2,4,6-trialkyl phenols have secondary or tertiary alkyl groups at the 2 and 6 positions, and a normal alkyl group at the 4 position. For example, preferred materials include 2,6-di-tert-butyl-p-cresol; 2,6-dicyclohexyl-p-cresol; 2,6-diisopropyl-4-ethylphenol; 2,6-di-tert-amyl-p-cresol; 2,6-di-tert-octyl-4-n-propylphenol; 2,6-dicyclohexyl-4-n-octylphenol; 2 - isopropyl-4-methyl-6-tert-butylphenol; 2-tert-butyl-4-ethyl-6-tert-octylphenol; 2-isobutyl-4-ethyl-6-tert - hexylphenol; and 2 - cyclohexyl-4-n-butyl-6-isopropyl phenol. Preferably, the 4 position alkyl group contains from 1 to 20 carbon atoms, and the 2 and 6 position alkyl groups are secondary or tertiary groups containing from 3 to about 20 carbon atoms, or cyclic hydrocarbon groups.

The other types of hindered phenols which are suitable for use in the compositions of this invention are those having the general structural formula:

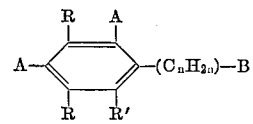

wherein $n$ is from 0 to 8; wherein β is selected from the group consisting of

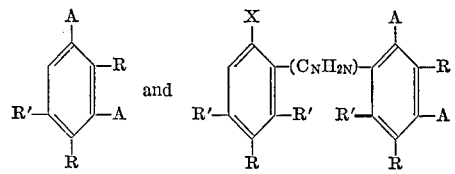

wherein one A on each ring is a hydroxyl group and the other A is R', X is R or a hydroxyl group, R is a hydrocarbon radical having from 1 to about 16 carbon atoms, and R' is selected from the group consisting of R and hydrogen. It is preferred that groups ortho to the hydroxyl groups be secondary or tertiary alkyl groups or cyclic radicals, since these appear to provide better hindering than normal alkyl groups.

Suitable phenolic compounds which can be used in the present invention are described in U.S. Patent 3,196,185, issued on July 20, 1965 to Ranson, the disclosure of which is hereby incorporated by reference.

These phenolic compounds are usually prepared by reacting an aldehyde with an excess of a phenol, and a large number of them are known in the art as stabilizers for various polymers. The use of such compounds to stabilize synthetic rubbers is described, for example, in United States Patent No. 2,731,443, issued Jan. 17, 1956, to Forman, and Patent No. 3,154,492, issued Oct. 27, 1964 to Reed discloses the use of such compounds to stabilize fuel and lubricating oils.

The substituents on the phenol nuclei include, for example, methyl, ethyl, propyl, butyl, amyl, hexyl, heptyl, octyl, nonyl, cyclohexyl, benzyl, and alphamethyl benzyl radicals, and similar hydrocarbon substituents having up to about 16 carbon atoms. Preferred stabilizers of the hindered bisphenol type include:

2,2'-methylene-bis-(4-methyl-6-tert-butylphenol),
2,2'-methylene-bis-(4-ethyl-6-tertbutyl phenol),
4,4'-isopropylidene-bis(2-tert-butyl phenol),
4,4'-methylene bis(2,6-di-tert-butyl phenol),
4,4'-methylene-bis(2,6-di-tertamyl phenol),
2,2'-methylene-bis-(p-cresol),
2,2'-methylene-bis(4,6-dimethyl phenol),
4,4'-methylene bis(-6-tertbutyl-o-cresol),
2,2'-ethylidene-bis-(4-6-dimethyl phenol),
2,2'-ethylidene-bis(4-methyl-6-butyl-phenol),
4,4'-bis(2-methyl-6-t-butyl phenol),
4,4'-bis(2,6-di-tert-butyl phenol),
2,6-bis-(2-hydroxy-3-t-butyl-5-methyl benzyl)-4-methyl phenol, and
bis(2-hydroxy-3-t-butyl-5-methyl phenyl methyl)durene.

The stabilized polyolefin compositions of this invention may also contain other stabilizers, such as materials which will absorb ultra-violet light. In addition, the stabilized polyolefin compositions may contain other conventional adjuvants such as processing aids, for example, the soaps of calcium and zinc, and also other materials such as pigments, dyes and fillers. Carbon black may be incorporated either as an absorbent or ultra-violet light or as a pigment.

The stabilized polyolefin compositions of the present invention exhibit improved stability and more particularly, improved stability against oxidative deterioration resulting from exposure to elevated temperatures. In addition, the stabilized polyolefin compositions of this invention exhibit enhanced stability against deterioration resulting from exposure to sunlight or ultra-violet light. Polyolefins stabilized in accordance with the present invention have extended life expectancies and can be used more effectively than unstabilized polyolefins for a wide diversity of uses. For example, the stabilized polyolefin compositions of this invention can be cast, extruded, rolled, or molded into sheets, rods, tubes, pipes, filaments or other shaped articles, and they may also be used for coating a wide variety of subsrtates.

The invention will be more readily understood with reference to the following examples, which are intended to illustrate but not limit the scope of the invention.

EXAMPLE 1

Preparation of β,β'-bis(dodecylthio)diethyl sulfone

To a 500 ml. 4-necked-round bottom flask equipped with theromometer, stirrer, condenser, and dropping funnel was added 83 g. (0.4 mole) dodecyl mercaptan, 150 ml. toluene and a small piece of sodium metal. The mixture was heated to 60° C. with stirring until the sodium metal had reacted. The dropwise addition of 23.6 g. (0.2 mole) divinyl sulfone dissolved in 50 ml. toluene was begun and the ensuing exothermic reaction permitted to proceed. Upon completion of addition, the temperature had risen to 85° C. at which time the reaction was heated at reflux for one hour. The reaction was neutralized with acetic acid, treated with Nuchar C–190 and filtered. The product, which crystallized on cooling, was collected by suction filtration and recrystallized from 1,4-dioxane; M.P. 89–89.5° C. Calculated for $C_{28}H_{58}O_2S$: C, 64.78%; H, 11.21%; S, 18.02%. Found: C, 64.45%; H, 10.99%; S, 18.00%.

EXAMPLE 2

Preparation of β,β'-bis(tetradecylthio)diethyl sulfone

The reaction of tetradecyl mercaptan and divinyl sulfone (2:1 molar ratio) was carried out in the manner described in Example 1. The product, which crystallized on cooling, was collected by suction filtration, washed with methanol and recrystallized from acetone; M.P. 94–95% C. Calculated for $C_{32}H_{66}O_2S_3$: C, 66.32%; H, 11.40%; S, 16.58%. Found: C, 64.63%; H, 10.93%; S, 16.11%.

EXAMPLE 3

Preparation of β,β'-bis(hexadecylthio)diethyl sulfone

The reaction of hexadecyl mercaptan and divinyl sulfone (2:1 molar ratio) was carried out in the manner described in Example 1. The product, which crystallized on cooling, was collected by suction filtration and recrystallized from acetone; M.P. 99–100° C. Calculated for $C_{36}H_{74}O_2S_3$: C, 68.06%; H, 11.76%; S, 15.14%. Found: C, 68.04%; H, 11.57%; S, 14.45%.

EXAMPLE 4

Preparation of β,β'-bis(octadecylthio)diethyl sulfone

The reaction of octadecyl mercaptan and divinyl sulfone (2:1 molar ratio) was carried out in the same manner described in Example 1. The product, which crystallized on cooling, was collected and recrystallized from 1,4-dioxane; M.P. 104–106° C. Caluculated for $$C_4OH_{82}O_2S_3$$

C, 69.56%; H, 11.88%; S, 13.92%. Found: C, 67.38%; H, 11.48%; S, 13.41%.

EXAMPLE 5

Preparation of β,β'-bis(4-t-butylphenylthio)diethyl sulfone

To a stirred mixture of 106.6 g. (0.6 mole) 4-t-butyl thiophenol, 100 ml. of toluene, and 5 g. sodium carbonate was added dropwise 29.5 g. (0.25 mole) divinyl sulfone. During the 20 minute addition period, the temperature rose from 22° C. to 31° C. The exotherm continued to 85° C. after which the reaction mixture was permitted to cool to room temperature. The product, which precipitated, was collected by suction filtration and recrystallized from isopropanol; M.P. 116° C. Calculated for $$C_{24}H_{34}O_2S_3$$

C, 63.95%; H, 7.62%. S, 21.34%. Found: C, 63.98%; H, 7.58%; S, 21.21%.

EXAMPLE 6

Preparation of β,β'-bis(benzylthio)diethyl sulfone

A solution of 124 g. (1 mole) benzyl mercaptan in 150 ml. toluene containing a small piece of sodium metal was heated to 65° C. until all the sodium was reacted. The dropwise addition of 59.1 g. (0.5 mole) divinyl sulfone was carried out during a 20 minute period while the exothermic reaction was maintained below 100° C. by means of external cooling. The reaction mixture was permitted to cool to room temperature at which time the product was collected from methanol; M.P. 96° C. Calculated for $C_{18}H_{22}O_2S_3$: S, 26.24%. Found: S, 25.59%

EXAMPLE 7

Preparation of didodecyl ester of β,β'-bis(carboxymethylthio)diethyl sulfone

To a stirred mixture of 130.2 g. (0.5 mole) lauryl thioglycollate and 5 g. sodium carbonate was added dropwise 29.5 g. (0.25 mole) divinyl sulfone. During the 20 minute addition period, the exothermic reaction was maintained below 100° C. with external cooling and subsequently heated to 85° C. for three hours. The reaction mixture, which solidified on cooling, was dissolved in methanol, treated with Nuchar C–190, filtered and allowed to cool. The product, which crystallized, was collected by suction filtration and dried; M.P. 62–64° C. Calculated for $C_{32}H_{62}O_6S_3$: C, 60.09%; H, 9.70%; S, 15.02%. Found: C, 58.20%; H, 9.14%; S, 15.00%.

EXAMPLE 8

Preparation of dioctadecyl ester of $\beta,\beta'$-bis(carboxymethylthio)diethyl sulfone The reaction of octadecyl thioglycollate and divinyl sulfone was carried out in the same manner as decribed in Example 7. The product was recrystallized from methanol; M.P. 74–75° C. Calculated for $C_{44}H_{86}O_6S_3$: C, 65.43%; H, 10.66%; S, 11.90%. Found: C, 66.37%; H, 10.75%; S, 12.28%.

EXAMPLE 9

Preparation of $\beta,\beta'$-bis(2-carboxyethylthio)diethyl sulfone

To a stirred mixture of 106 g. (1 mole) 3-mercaptopropionic acid, 5 g. sodium carbonate, and 100 ml. toluene was added dropwise 59 g. (0.5 mole) divinyl sulfone. Following a 45 minute addition period, during which time there was no appreciable temperature rise, the reaction mixture was heated to reflux for two hours. The product, which crystallized on cooling, was collected by suction filtration and recrystallized from methanol; M.P. 179–180° C. The neutralization equivalent of the product was 169.7 versus the value calculated for $\beta,\beta'$-(2-carboxyethylthio)diethyl sulfone of 165.23.

EXAMPLE 10

Preparation of diododecyl ester of $\beta,\beta'$-bis(2-carboxyethylthio)diethyl sulfone A mixture of 82.6 g. (0.25 mole) of the $\beta,\beta'$-bis(2-carboxyethylthio)diethyl sulfone obtained as described in Example 9, 200 g. (1.08 moles) dodecyl alcohol, and 8 g. potassium bisulfate were heated at 150° C. and 90 mm. pressure for four hours. The cooled reaction product was washed with 5% sodium carbonate solution, collected by suction filtration, and recrystallized from isopropanol; M.P. 76–78° C. Calculated for $C_{34}H_{66}O_6S_3$: C, 61.20%; H, 9.99%; S, 14.42%. Found: C, 61.88%; H, 10.02%; S, 13.31%.

EXAMPLE 11

Preparation of ditetradecyl ester of $\beta,\beta'$-bis(2-carboxyethylthio)diethyl sulfone The esterification of $\beta,\beta'$-bis(2-carboxyethylthio)diethyl sulfone with tetradecyl alcohol was carried out in the same manner as described in Example 10. The product was collected and recrystallized from methanol; M.P. 88–89° C. Calculated for $C_{38}H_{74}O_6S_3$: C, 63.10%; H, 10.33%; S, 13.30%. Found: C, 62.13%; H, 10.05%; S, 13.11%.

EXAMPLE 12

Preparation of dioctadecyl ester of $\beta,\beta'$-bis(2-carboxyethylthio)diethyl sulfone The esterification of $\beta,\beta'$-bis(2-carboxyethylthio)diethyl sulfone with octadecyl alcohol was carried out in the same manner as described in Example 10. The product was collected by suction filtration and recrystallized from benzene; M.P. 92–94° C. Calculated for $C_{46}H_{90}O_6S_3$: C, 66.12%; H, 10.88%; S, 11.51%. Found: C, 66.46%; H, 10.40%; S, 11.51%.

EXAMPLE 13

Preparation of dipotassium salt of $\beta,\beta'$-bis(2-carboxyethylthio)diethyl sulfone To a solution of 9.0 g. (0.17 mole) potassium hydroxide in 200 ml. methanol was added 26.4 (0.08 mole) $\beta,\beta'$-bis(2-carboxyethylthio)diethyl sulfone prepared by the process of Example 9. The mixture was heated at 60° C. with stirring for 2 hours, cooled to 25° C., and filtered by suction filtration. Following a methanol wash, the dried product exhibited a decomposition point above 225° C.

EXAMPLE 14

Preparation of monopotassium salt of $\beta,\beta'$-bis(2-carboxyethylthio)diethyl sulfone In a manner similar to Example 13, the reaction of $\beta,\beta'$-bis(2-carboxyethylthio)diethyl sulfone with potassium hydroxide at a 1:1 molar ratio was carried out in methanol. The monopotassium salt so obtained decomposed above 225° C.

EXAMPLE 15

Preparation of disodium salt of $\beta,\beta'$-bis(2-carboxyethylthio)diethyl sulfone In a manner similar to Example 13, the reaction of $\beta,\beta'$-bis(2-carboxyethylthio)diethyl sulfone with sodium hydroxide (1:2 molar ratio) was carried out in methanol. The disodium salt decomposed above 225° C.

EXAMPLE 16

Preparation of monosodium salt of $\beta,\beta'$-bis(2-carboxyethylthio)diethyl sulfone In a manner similar to Example 13, the reaction of $\beta,\beta'$-bis(2-carboxyethylthio)diethyl sulfone with sodium hydroxide (1:1 molar ratio) was carried out in methanol. The monosodium salt decomposed above 240° C.

EXAMPLE 17

Preparation of calcium salt of $\beta,\beta'$-bis(2-carboxyethylthio)diethyl sulfone To a heated solution of 30 g. (0.08 mole) of disodium salt of $\beta,\beta'$-bis(2-carboxyethylthio)diethyl sulfone, prepared by the process of Example 15, in 150 ml. water was added a solution of 8.9 g. (0.08 mole) calcium chloride in 150 ml. of water. The final solution was heated at 85° C. with stirring for 5 hours during which time a precipitate was formed. The mixture was cooled and the product, collected by suction filtration, exhibited a decomposition point above 280° C.

EXAMPLE 18

Preparation of $\beta,\beta'$-bis,2-hydroxyethylthio)diethyl sulfone

To a mixture of 78.0 g. (1 mole) 2-mercaptoethanol, 400 ml. of toluene and 5.0 g. sodium carbonate, heated at 95° C., was added 58 g. (.49 mole) divinyl sulfone during a 1 hour period. Following the addition, the reaction mixture was heated at reflux for 1 hour and then filtered hot (80° C.). On cooling the product which crystallized was collected by suction filtration and recrystalized from isopropanol, M.P. 82–84° C. Calculated for $C_8H_{18}O_4S_3$: C, 35.04%; H, 6.57%; S, 35.04%. Found: C, 34.89%; H, 6.40%; S, 34.92%.

EXAMPLE 19

Preparation of dilauric acid ester of $\beta,\beta'$-bis(2-hydroxyethylthio)diethyl sulfone A mixture of 24.5 g. (.09 mole) $\beta,\beta'$-bis(2-hydroxyethylthio)diethyl sulfone prepared by the process of Example 18, 50 g. (.25 mole) lauric acid, and 5 g. potassium bisulfate was heated at 165° C. and 25 mm. pressure for 5 hours. Following this esterification reaction, the product was cooled and recrystallized from isopropanol, M.P. 93–95° C. Calculated for $C_{32}H_{62}O_6S_3$: S, 15.05%. Found: S, 15.27%.

EXAMPLE 20

Preparation of $\beta,\beta'$-bis(2-benzothiazolythio)diethyl sulfone

To a mixture of 75 g. (.45 mole) 2-mercaptobenzothiazole, 250 ml. toluene, and 5 g. sodium carbonate heated to 90° C. was added 25 g. (.21 mole) divinyl sulfone. During the 30 minute addition period the temperature of the reaction mixture decreased to 60° C. The reaction mixture was heated to reflux for 1 hour and then cooled. The viscous oil thus obtained, crystallized on standing for approximately 2 weeks and was then recrystallized from acetone, M.P. 114–116° C. Calculated for $C_{18}H_{28}N_2O_2S_5$: N, 6.02%. Found: N, 5.98%.

EXAMPLE 21

Preparation of β-(4-t-butyl-2-methylphenylthio)propyl-p-tolyl sulfone

A stirred mixture of 29.3 g. (0.2 mole) allyl p-tolyl sulfone, 42.0 g. (0.23 mole) 4-t-butyl-o-thiocresol, and 0.5 g. sodium methoxide was heated at 95° C. for 4 hours. The product, obtained as a pale yellow oil, was neutralized with dilute aqueouse hydrochloric acid, washed with water, and dried. Iodometric titration indicated less than 0.5% mercaptan. Vapor phase chromatography confirmed the essentially pure product. Calculated for $C_{21}H_{28}O_2S_2$: S, 17.02%. Found: S, 16.15%.

The above examples describe the preparation of the thioethyl sulfones of the present invention. The examples following describe the preparation of stabilized polyolefin compositions, wherein the thioethyl sulfones of this invention are utilized.

Stabilized polypropylene compounds were prepared by dry mixing virgin polymer with appropriate percentages of stabilizers. To each dry mix was also added 0.5% calcium stearate as a lubricant. Once the dry powder mixing was completed, the compound was milled at 345° F. for five minutes to densify the polypropylene. The milled sheet of polypropylene was then granulated.

In order to measure the service life of the stabilized polymer, granules were placed in a mold and 20 mils thick sheets prepared by compression molding at 375° F. These sheets were then cut into smaller slivers of ½″ x 2″ and aged in an accelerated single cell ageing oven at 150° C. with an air flow rate of 1 cc./minute over the sample. The embrittlement time was taken as the number of hours required to cause crazing or crumbling of the test piece.

The melt stability studies were carried out by taking a 20 gm. sample of the granulated polypropylene and measuring the melt flow index (M.F.I.) as per ASTM D1238–62T. The remainder of the granulated polymer was extruded under the following conditions:

Heating: ° F.
   1st zone _____ 340
   2nd zone _____ 355
   3rd zone _____ 470
   Die _____ 540
   Extrudate _____ 500

Note.—Screw speed 26 r.p.m. Screen pack 1 x 30; 1 x 60; 2 x 80. Extruder dwell time: 3 minutes.

After extrusion, the extrudate was granulated and the M.F.I. measured. This process was repeated five times and the factor changes in M.F.I. (M.F.I.) calculated, i.e., M.F.I.

$$\frac{(M.F.I.)_n}{(M.F.I.)_1}$$

where $l$ signifies the initial value and $n$ the value after the $n$th extrusion.

Example 22

Antioxidant formulations were prepared as described above, utilizing the hindered phenol antioxidant described in U.S. Patent No. 3,154,492; [tris-(2-methyl-4-hydroxy-5-t-butylphenyl)butane]. Dilaurylthiodipropionate (DLTP), which is a conventional thioether antioxidant and several β,β′-dithioethyl sulfones indicated by examples numbers. The percent of each antioxidant or antioxidant mixtures used, and the embrittlement times and factor changes in melt flow indices of the stabilized polyolefin compositions (Avisun unstabilized polypropylene with a weight average molecular weight of 200,000 and a flow rate of 6 was used as the polyolefin) are reported in Tables I and II below:

TABLE I.—STABILIZED POLYPROPYLENE EMBRITTLEMENT TIMES

| Antioxidant Formulation In Parts per 100 Parts of Resin | Hours at 150° C. |
|---|---|
| 0.05 Phenol/0.20 DLTP | 600 |
| 0.10 Phenol/0.25 DLTP | 672 |
| 0.05 Phenol/0.20 Example 2 | 1,800 |
| 0.10 Phenol/0.25 Example 2 | 2,016 |
| 0.05 Phenol/0.20 Example 8 | 840 |
| 0.10 Phenol/0.25 Example 8 | 872 |
| 0.05 Phenol/0.20 Example 10 | 1,200 |
| 0.10 Phenol/0.25 Example 10 | 1,225 |

TABLE II.—FACTOR CHANGES IN MELT FLOW INDICES OF EXTRUDED POLYPROPYLENE

| Antioxidant Formulation in Parts per 100 Parts of Resin | Factor Change In M.F.I. With Each Extrusion | | | | |
|---|---|---|---|---|---|
| | 1 | 2 | 3 | 4 | 5 |
| 0.05 Phenol | 1.7 | 2.5 | 3.9 | 4.6 | 5.6 |
| 0.05 Phenol/0.15 DLTP | 1.7 | 2.9 | 4.2 | 5.5 | Very High |
| 0.05 Phenol/0.15 Example 1 | 1.6 | 2.1 | 3.0 | 4.0 | 4.9 |
| 0.05 Phenol/0.15 Example 2 | 1.6 | 2.4 | 3.2 | 4.2 | 5.1 |
| 0.05 Phenol/0.15 Example 3 | 1.7 | 2.4 | 3.2 | 4.0 | 4.8 |
| 0.05 Phenol/0.15 Example 5 | 1.7 | 2.2 | 2.7 | 3.5 | 4.2 |
| 0.05 Phenol/0.15 Example 11 | 1.5 | 2.5 | 3.8 | 5.1 | 5.6 |

Obviously many modifications and variations of the present invention are possible in light of the above teachings.

What is claimed is:
1. β-Thioethyl sulfones having the formula

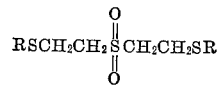

wherein R is an alkyl radical containing from 12–18 carbon atoms.

2. Thioethyl sulfones as claimed in claim 1 wherein said sulfone is β,β′-bis(dodecyl thio)diethyl sulfone.

3. Thioethyl sulfones as claimed in claim 1 wherein said sulfone is β,β′-bis(tetradecyl thio)diethyl sulfone.

4. Thioethyl sulfones as claimed in claim 1 wherein said sulfone is β,β′-bis(hexadecyl thio)diethyl sulfone.

5. Thioethyl sulfones as claimed in claim 1 wherein said sulfone is β,β′-bis(octadecyl thio) diethyl sulfone.

References Cited

Fromm et al.: "Chemical Abstracts," vol. 18 (1924), pp. 1112–13.

Helfrich et al.: "Chemical Abstracts," vol. 14 (1920), pp. 2486–87.

Reid: "Chem. of Bivalent Sulfur," vol. 2 (1960), pp. 29–34.

CHARLES B. PARKER, Primary Examiner

D. R. PHILLIPS, Assistant Examiner

260—45.85, 45.95, 306, 410.9, 469, 470, 476, 479, 481, 516, 526